May 21, 1963   F. M. MAYES   3,090,232
TANK GAUGE
Filed May 31, 1960
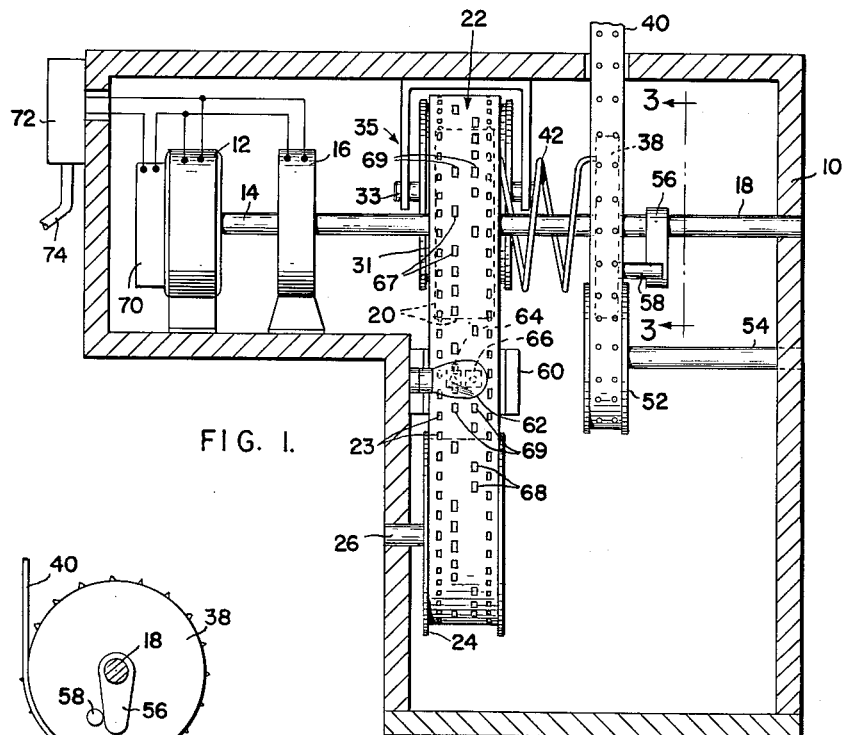
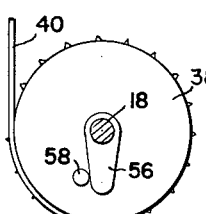
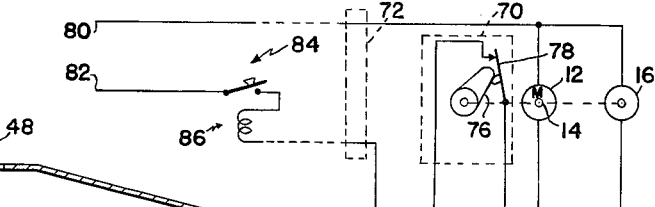
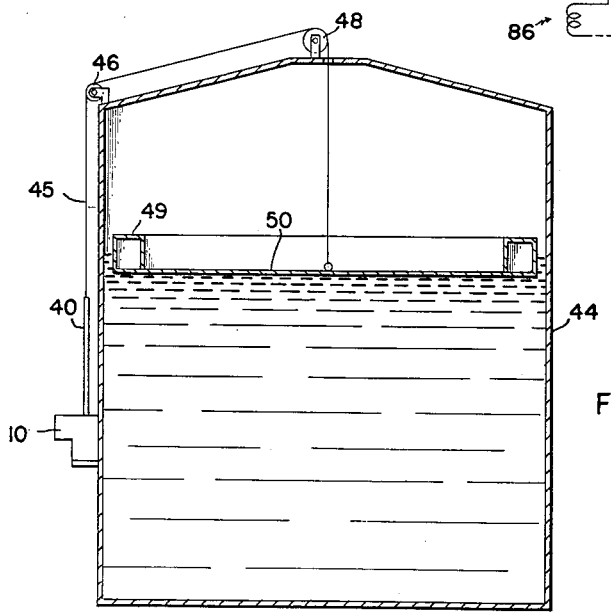
*INVENTOR.*
FRED M. MAYES
BY
*ATTORNEYS*

United States Patent Office 3,090,232
Patented May 21, 1963

3,090,232
TANK GAUGE
Fred M. Mayes, Richardson, Tex., assignor to Sun Oil Company, Philadelphia, Pa., a corporation of New Jersey
Filed May 31, 1960, Ser. No. 33,031
8 Claims. (Cl. 73—321)

This invention relates to tank gauges and particularly to means for indicating the level of a liquid in a tank.

While the invention is applicable wherever it is desired to indicate the position of a movable member, the invention will be described primarily with reference to indicating the position of a floating roof resting upon and supported by a liquid contained in a tank. A knowledge of the position of the floating roof will, of course, permit a determination of the liquid level and hence the volume of the liquid in the tank.

It is an object of this invention to indicate the position of a floating roof or other movable member without moving, for the purpose of securing a reading, a cable means which is connected to the roof. In accordance with the present invention, the desired result is accomplished by providing a resilient connection between a coded tape and the cable. The coded tape and the cable are coupled for conjoint movement in accordance with the movement of the roof with change of liquid level. However, when it is desired to gauge the position of the roof, the resilient connection permits movement of the coded tape independently of the cable.

The foregoing and other objects of the invention particularly relating to details of construction and operation will become apparent from the following description read in connection with the accompanying drawing, wherein:

FIGURE 1 is a vertical section of a signal transmitting means involved in a preferred embodiment of the invention;

FIGURE 2 is a vertical section showing the connection of apparatus embodying the invention to a floating roof;

FIGURE 3 is a section taken on line 3—3 of FIGURE 1; and

FIGURE 4 is a diagram of the electrical and mechanical elements controlling the operation of the apparatus shown in FIGURE 1.

The signal transmitting means shown in FIGURE 1 comprises a casing 10 which carries a motor 12 the shaft 14 of which is arranged to be coupled by a magnetic clutch 16 to a shaft 18 rotatably mounted in casing 10. The motor 12 drives shaft 14 through reduction gearing such that shaft 14 will rotate relatively slowly, as for example, one revolution per second. A toothed sprocket 20 for a coded film 22 is fixedly mounted on shaft 18 for rotation therewith and has teeth engaging openings 23 in the film 22. Film 22 passes to a takeup reel of a spring motor 24 which is mounted on a shaft 26 and is desirably of a well-known type arranged to provide an approximately constant tension on film 22 to take up the same. The other end of the film 22 passes from sprocket 20 to a takeup reel of a spring motor 31 rotatably carried by a shaft 33 and a frame 35 mounted on casing 10. Spring motor 31 is desirably of a well-known type arranged to provide an approximately constant tension on film 22 to tend to wind up the film 22 passing from the sprocket 20. It is thus apparent that the film 22 passes from the takeup reel of spring motor 31 about a portion of the circumference of the sprocket 20 and onto the takeup reel of spring motor 24. The movement of the sprocket 20 will, of course, determine the position of the film 22. Spring motor 24 and spring motor 31 are constructed to apply the same small bias to the film 22, which bias is merely sufficient to wind up the unreeled film. Hence, there is no tendency for these springs to cause any rotation of the sprocket 20 which will be positioned in a manner described hereinafter.

A toothed sprocket 38 is carried by and is freely rotatable on shaft 18 and has a perforated metallic tape 40 passing thereabout, the teeth of sprocket 38 engaging the openings in the perforated tape 40. The tape 40 then passes to the takeup reel of a spring motor 52 which is desirably of a well-known type arranged to provide a tension on the tape 40 at the lower end thereof. The spring motor 52 is supported on a shaft 54 journalled in casing 10. As shown in FIGURE 2, the casing 10 may be mounted on a tank 44 and the upper end of tape 40 is connected to a cable 45 which is guided by pulleys 46 and 48 for connection to a floating roof 50. The floating roof 50 includes a pontoon 49 containing air which provides the buoyancy to maintain the roof 50 floating on the surface of the liquid within the tank 44. The spring motor 52 is provided only to maintain the tape 40 and the cable 45 in a tensioned condition so that the position of the sprocket 38 always bear an accurate relationship to the vertical position of the roof 50, this being true throughout a large range of roof movement, which may range over 50 feet. It will be noted that the spring motor 52 is not strong enough to exert a tension on tape 40 to displace appreciably the roof 50, the position of which is determined by the liquid level in the tank.

An arm 56 is fixedly mounted on shaft 18 adjacent sprocket 38 and is enagable by a stud 58 mounted on the sprocket 38. A normally coiled spiral spring 42 is connected between sprockets 20 and 38. Spring 42 acts through sprocket 20 and shaft 18 to bias arm 56 into engagement with stud 58 to thereby normally maintain sprockets 20 and 38 in the same relative position. Thus, the position of sprocket 20 will normally correspond to the position of sprocket 38. Since the position of sprocket 38 is determined by the position of the floating roof 50 to which the tape 40 is connected, the film 22 may be coded with perforations or markings indicative of the position of the roof 50.

The film 22 passes from sprocket 20 through a guide 60 between a lamp 62 and a pair of photocells 64 and 66, which are preferably phototransistors. The film 22 and the code reading circuit responsive to the illumination of photocells 62 and 64 may be of the type disclosed in the copending application of Fred M. Mayes and Jack W. Jones, Serial No. 611,291, filed September 21, 1956. For the purposes of the present disclosure it will suffice to state that the film contains along its length in an opaque background two sets of transparent areas 67 and 68. It will be apparent that the transparent and opaque regions may be reversed or openings could be provided in an opaque tape or film wherefore the transparent areas will be hereinafter referred to as "openings." The series of openings 67 and 68 are associated with the photocells 64 and 66, respectively, across which they pass as shown in FIGURE 1. At intervals, openings of the groups 67 and 68 occur in pairs as indicated at 69. These paired openings may occur at intervals along the film corresponding to displacements of the float of 0.1 foot. The openings of either one or the other series 67 and 68 occur at regular intervals, there being one of these at each opening interval. The openings 68 may be referred to as digit openings and the openings 67 as zero openings, as will appear apt from a consideration of the binary coding system which they represent. The binary coding system is more fully described in said prior-mentioned application. The length of each opening in the direction of the length of the film is the same as the spacing between successive openings. Considering both the openings and the space between them, the intervals between corresponding ends of the pairs 69 of the openings are so divided into twenty-four equal spaces, and consistent with what has been said, this means that the length of each opening and the length of space between each pair of openings corresponds closely to 0.004 foot of float displacement. Between the successive sets of double openings 69, the digit and zero openings are coded to give a number corresponding to feet and tenths of feet of float height.

The foregoing provides an elongated film member provided with coded markings disposed in two series extending lengthwise of the film and in successive groups between the double markings 69 distributed along the length of the member. Each of these groups is approximately the same length along the film as adjacent preceding and following groups. In each group the coding is such that complete information is embodied in the markings of each group and identifies the location of the group along the member, the complete information involves all of the markings of a group. The markings in each group are photo-electrically sensed. As will appear, a small range of relative movement in excess of the length of a group, is provided between the film and the sensing means so that in each small range of movement the sensing means will sense all of the markings in at least one group to provide signals indicating the portion of the film being read. Means responsive to the signals from the sensing means provided decimal signals indicating the portion of the film being read.

By using a coded film and reading circuit such as that disclosed in the prior-mentioned application of Mayes and Jones, to which reference may be made for a more detailed description, it is possible to read the position of the floating roof 50 with a high degree of accuracy and with a short travel of the coded film 22 during the reading operation.

The motor 12 and the magnetic clutch 16 are electrically connected through a control switching apparatus 70 to a terminal box 72 for connection by an electrical cable 74 to the control station where the film readings are made. As shown in FIGURE 4, the control switching apparatus 70 comprises a cam 76 mounted for rotation with the shaft 14 of the motor 12. The cam is engageable with the switch arm of a normally closed switch 78 serially connected in the motor and clutch supply circuit which is adapted for connection to a source of electrical energy at terminals 80 and 82. Also serially connected in the supply circuit is a normally open push-button switch 84 and solenoid 86 for controlling the operation of the motor 12 and the clutch 16.

In the operation of the apparatus, the position of the tape 40 will correspond to the position of the floating roof 50 by reason of the connection of the tape 40 thereto. As the position of the floating roof changes, this change will be transmitted by the tape 40 to the sprocket 38 which will act through stud 58, arm 56, shaft 18 and sprocket 20 to correspondingly change the position of the film 22. This conjoint movement is assured by the spring 42 which biases the arm 56 into contact with the stud 58 to thereby position the sprocket 20 in accordance with the position of the sprocket 38. The coded film 22 will thus be in a position indicating the level of the floating roof 50.

When it is desired to read the film the push-button switch 84 is closed to energize the motor 12 and magnetic clutch 16 to drive the shaft 18 in a counterclockwise direction, as viewed in FIGURE 3, thereby running the film 22 from the sprocket 20 to pass the same over the photocells 64 and 66, the reel of spring motor 24 serving to take up the film 22. The shaft 18 and the sprocket 20 may be actuated through this reading movement without affecting the position of the sprocket 38 by reason of the resilient connection provided by spiral spring 42 and the freely rotatably mounting of sprocket 38 on shaft 18. The spring 42 will wind up against its unwinding bias during this reading movement. Since the reading movement of shaft 18 and sprocket 20 is in a direction moving arm 56 away from stud 58, there will be no initial interference by the stud 58 with this reading movement. However, it is apparent that if the shaft 18 were rotated more than one revolution, the arm 56 would contact the stud 58. Since the sprocket 38 is at this time prevented from rotating in a counterclockwise direction, as viewed in FIGURE 3, by the tape 40 by reason of its connection to the floating roof 50, a rotative movement of shaft 18 greater than one revolution would result in undesirable stresses in the apparatus.

The switching apparatus 70 insures that shaft 18 will not be rotated more than one revolution. When the push-button switch 84 is closed the circuit is completed through solenoid 86 which magnetically maintains the push-button switch 84 in a closed position against the normally open bias thereof even upon release of the push-button 84. After approximately one revolution of the shaft 14 of motor 12 which drives shaft 18 through clutch 16, cam 76 will move to a position to momentarily open switch 78 to break the circuit of the motor 12 and the clutch 16 and deenergize the solenoid 86. The breaking of the circuit of the motor 12 and the clutch 16 will thus terminate the rotation of shaft 18 and the deenergization of the solenoid 86 will permit push-button switch 84 to move to the open position thereof whereby the motor 12 and the clutch 16 will remain deenergized. Thus the switching apparatus 70 serves to limit the movement of shaft 18 to approximately one revolution each time the push-button switch 84 is actuated.

Since the reel 20 will move through almost a complete revolution, a sufficient length of the coded film 22, which only requires a small movement to provide a reading, will have passed over the photocells 64 and 66 to give an accurate reading of the position of the floating roof 50. After the reading is completed, the spring 42 will unwind to return the film 22 and sprocket 20 to the normal position thereof as shown in the drawings with the film once again corresponding to the position of tape 40.

It will be understood that the invention is not to be regarded as limited except as required by the following claims.

What is claimed is:

1. Apparatus for indicating the position of a movable member comprising an elongated member having one end connected to said movable member, means connected to the other end of said elongated member for maintaining the same in a taut condition for all positions of the movable member whereby said elongated member is movable with the movable member, a rotatably mounted reel operatively connected to said elongated member for rotation in response to movement of said elongated member, a second rotatably mounted reel, a coded tape operatively connected to said second reel and movable in accordance with the movement of said second reel, a resilient coupling between said reels, said resilient coupling transmitting the movement of said first-named reel to said second reel to cause movement of said coded tape, stop means connected to said reels for normally maintaining said reels in the same respective position under the bias of said resilient coupling, and means for rotating said second reel against the bias of said coupling to cause relative movement of said second reel with respect to said first-named reel.

2. Apparatus as claimed in claim 1 wherein said stop means includes a first stop member mounted for movement with said first reel and a second stop member mounted for movement with said second reel, said resilient coupling biasing said first and second stop members into contact, said first and second stop members being moved out of contact during said relative movement of said second reel.

3. Apparatus as claimed in claim 1 wherein said resilient coupling comprising a helical spring connected between said first and second reels.

4. Apparatus as claimed in claim 1 including means maintaining said coded tape in a taut condition during said movement thereof.

5. Apparatus for gauging the level of a liquid in a tank comprising a floating roof supported on the liquid in the tank, an elongated member having one end connected to said floating roof, means connected to the other end of said elongated member for maintaining the same in a taut condition for all positions of said floating roof whereby said elongated member is movable with said roof, a rotatably mounted reel operatively connected to said elongated member for rotation in response to movement of said elongated member, a second rotatably mounted reel, a coded tape operatively connected to said second reel and movable in accordance with the movement of said second reel, a resilient coupling between said reels, said resilient coupling transmitting the movement of said first-named reel to said second-named reel to cause movement of said coded tape, said coded tape having markings corresponding to the position of said roof, stop means connected to said reels for normally maintaining said reels in the same respective position under the bias of said resilient coupling, and means for rotating said second reel against the bias of said coupling to cause relative movement of said second reel with respect to said first-named reel.

6. Apparatus for gauging the level of a liquid in a tank comprising a floating roof supported on the liquid in the tank, follower means connected to said roof and movable in accordance with the movement thereof, means operable through a movement for indicating the level of liquid in the tank, a resilient coupling between said follower means and said indicating means for positioning said indicating means in accordance with the position of said roof, and means for actuating said indicating means through a level indicating movement independently of any follower means movement, said resilient coupling absorbing said independent movement of said indicating means.

7. Apparatus for indicating the position of a movable member comprising a first rotatable means, means connecting said first rotatable means to the member for rotation in response to movement of the member, a second rotatable means, means interconnecting said first and second rotatable means to cause conjoint movement thereof in response to movement of the member, means movable by said second rotatable means and having markings corresponding to the position of the member, said means interconnecting said first and second rotatable means including a resilient means for absorbing movement of said second rotatable means relative to said first rotatable means, and means for actuating said second rotatable means relative to said first rotatable means to cause movement of said marked means.

8. Apparatus for indicating the position of a movable member comprising a first rotatable means, means connecting said first rotatable means to the member for rotation in response to movement of the member, a second rotatable means, means interconnecting said first and second rotatable means to cause conjoint movement therof in response to movement of the member, means movable by said second rotatable means and having markings corresponding to the position of the member, said means interconnecting said first and second rotatable means including a resilient means for absorbing movement of said rotatable means relative to said first rotatable means, said means connecting the first rotatable means to the member being arranged to restrict movement of said first rotatable means in one direction in conjunction with said second rotatable means movement in said one direction when said member is stationary, and means for actuating said second rotatable means in said one direction relative to said first rotatable means to cause movement of said marked means.

References Cited in the file of this patent
UNITED STATES PATENTS

| | | |
|---|---|---|
| 197,800 | Schrom | Dec. 4, 1877 |
| 2,496,366 | Adelson | Feb. 7, 1950 |
| 2,808,506 | Skwarek | Oct. 1, 1957 |